Patented July 5, 1932

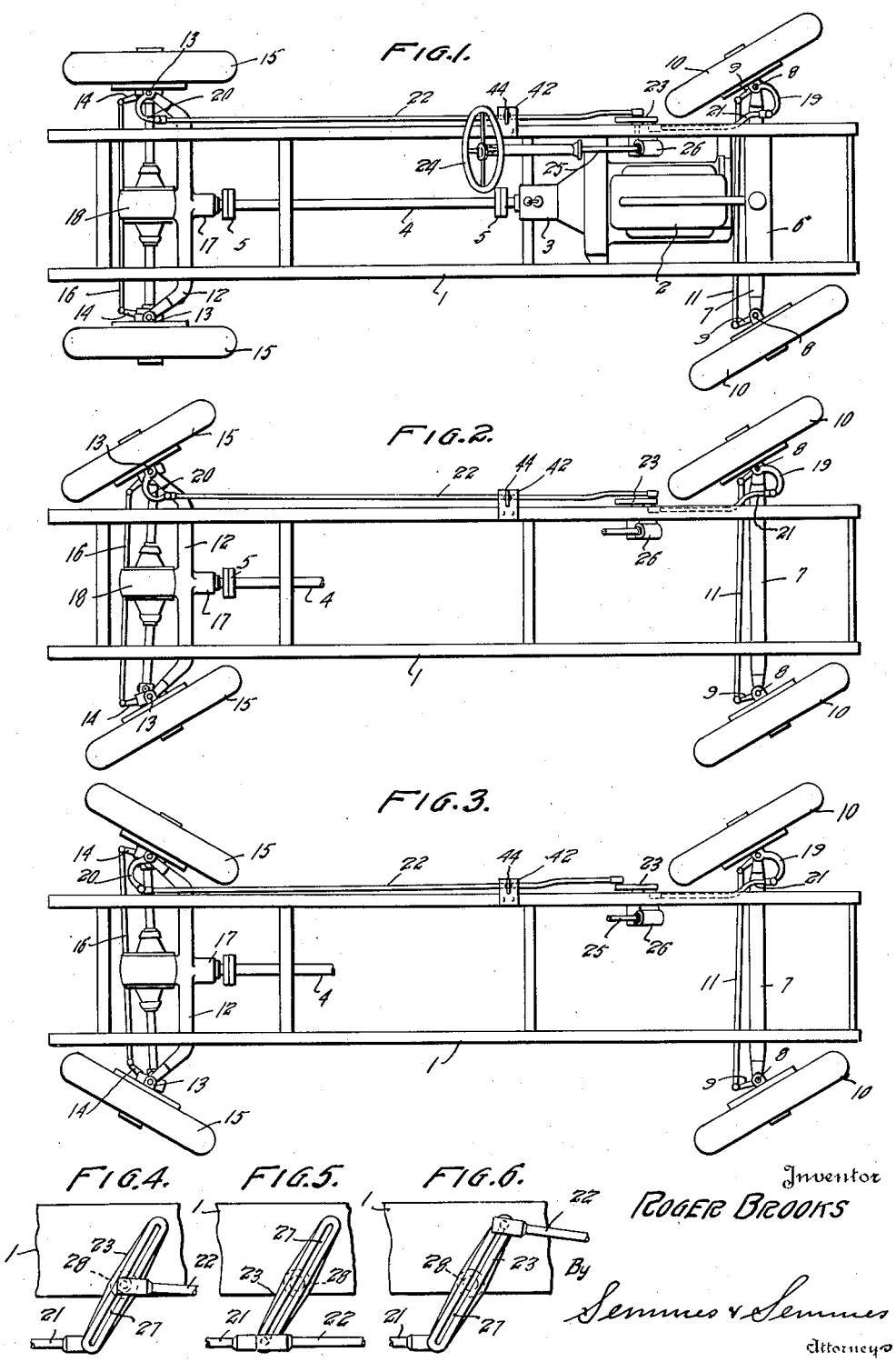

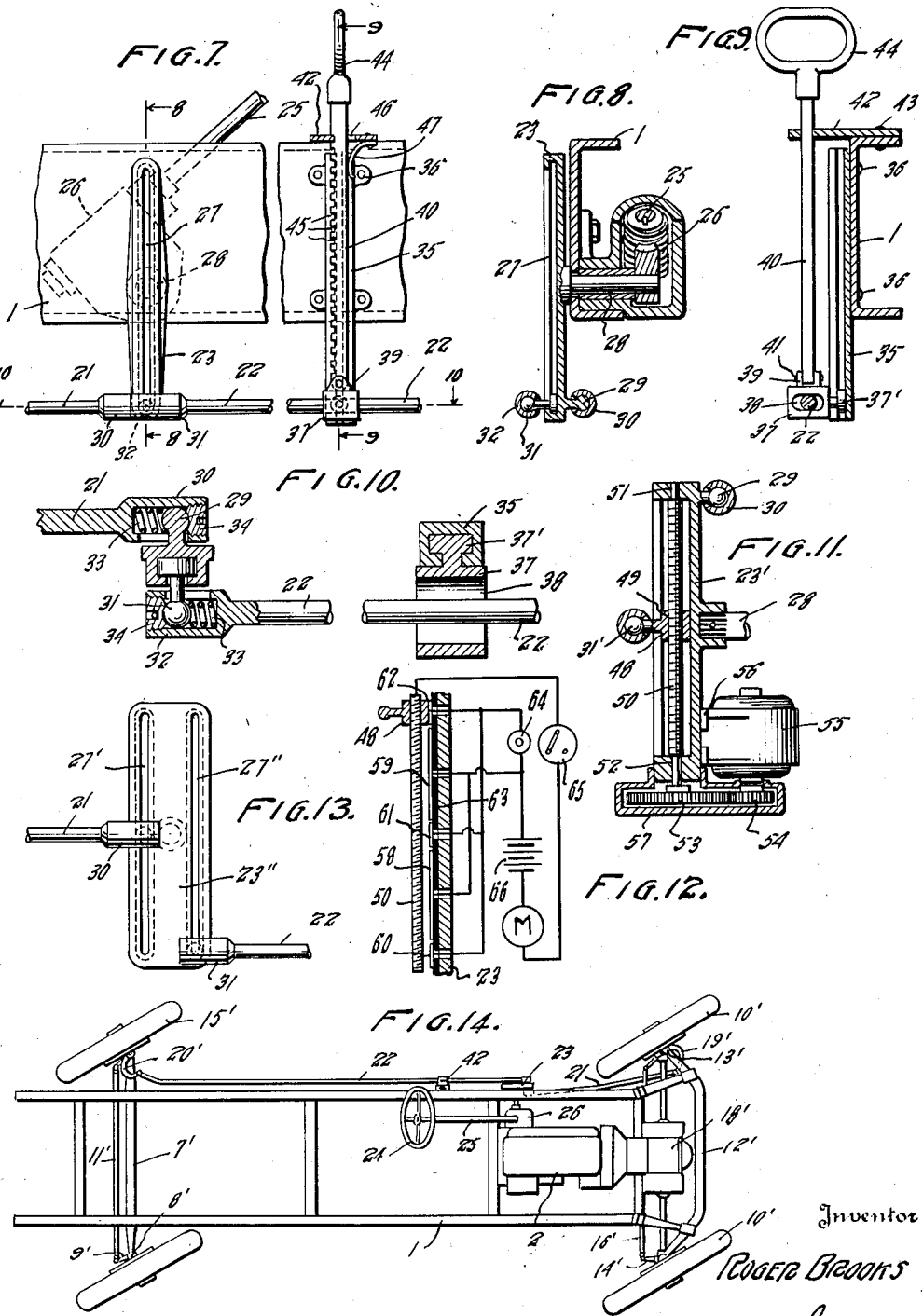

1,866,393

UNITED STATES PATENT OFFICE

ROGER BROOKS, OF WASHINGTON, DISTRICT OF COLUMBIA

STEERING APPARATUS

Application filed February 6, 1931. Serial No. 514,033.

This invention relates in general to vehicles, and more particularly has reference to a new and improved means for steering vehicles.

Heretofore it has been customary to provide one pair of wheels of a four wheel vehicle with means whereby they might be turned with respect to the longitudinal axis of the vehicle so as to change the direction of travel. This has commonly been accomplished by providing swivelling members or knuckles upon which the front wheels are mounted. These swivelling knuckles are then connected to a means whereby they may be turned simultaneously.

In the past there have also been provided means whereby all four of the wheels of a vehicle might be turned simultaneously. These means, however, are limited to the turning of one pair of wheels in one direction and the other pair of wheels in the other direction so as to enable the vehicle to make a very short turn.

Up to this time there has not been so far as I am aware any provision whereby all four wheels of a vehicle might be swivelled simultaneously in a certain direction so as to allow the vehicle to move laterally with both ends at the same time. It will be appreciated that such a feature as this would be of considerable value in parking vehicles where the parking is done parallel to the curb. In such an instance, all four wheels being swivelled in the same direction, the vehicle could be moved laterally and hence parked between two other vehicles previously parked with much more ease than with the present system of steering.

In the prior art no provision has been made for changing the operation of the steering mechanism at the will of the operator. Especial reference is had to a steering mechanism in which one set of wheels may be locked in its neutral position or may be caused to swivel either in the same direction as or in the opposite direction to the other set of wheels according to the will of the operator. It will readily be seen that such an arrangement as this would be advantageous over any mechanism in which the steering is accomplished in any single manner.

To overcome the above and other disadvantages of construction in steering apparatus is one of the objects of this invention.

Another object of this invention is to provide a steering apparatus for vehicles in which one set of swivelling wheels may be locked in neutral position and the other set only used in steering the vehicle.

Another object of this invention is to provide a steering apparatus in which both sets of swivelling wheels may be swivelled simultaneously but in opposite directions so as to allow the vehicle to make a turn of very short radius.

Yet another object of this invention is to provide a steering apparatus in which both sets of swivelling wheels may be caused to swivel simultaneously and in the same direction so as to allow the vehicle to move bodily laterally from its normal line of travel.

Still another object of this invention is to provide a means whereby a steering apparatus may be changed in its functioning so as to allow one set of swivelling wheels to be locked while the other set is swivelled or so as to allow the one set to be swivelled simultaneously with the other set in either the same or the opposite direction according to the will of the operator.

Still another object of this invention is to provide a means whereby either of two sets of wheels of a vehicle may be locked while the other set is swivelled in steering the vehicle.

To accomplish the above and other important objects, my invention comprehends a means for providing both front and rear swivelling wheels for a vehicle and connecting these wheels to a common steering lever for operation thereby. One or both of these connections is made slidable with respect to said lever in order that it may be positioned at either side of or at the axis of said lever. By this means one or both of the sets of swivelling wheels may be locked with respect to the vehicle while the other set is allowed to be swivelled in order to steer the vehicle in normal operation.

To insure an adequate comprehension of my invention and wishing it to be distinctly understood that various modifications may be made in the preferred embodiment herein shown and described without departing from the spirit or scope of my invention, reference is made to the accompanying drawings in which similar numerals indicate corresponding parts.

Figure 1 is a plan view of the chassis of a vehicle constructed in accordance with my invention, the apparatus being so adjusted in this view that the rear wheels are locked with respect to the vehicle while the front wheels are allowed to swivel in steering.

Figure 2 is a view similar to Figure 1 in which the adjustment has been changed so as to cause all four wheels to swivel simultaneously in the same direction.

Figure 3 is a view similar to Figures 1 and 2 except that the apparatus is so adjusted that all four wheels will swivel simultaneously but in opposite directions.

Figures 4, 5 and 6 are detail views of the steering lever of my invention illustrating the positions of the various steering connections in Figures 1, 2 and 3, respectively.

Figure 7 illustrates the novel steering lever of my invention and discloses a means whereby one of the steering connections may be shifted longitudinally of said lever.

Figure 8 is a sectional view of my improved lever and its operating mechanism taken along the line 8—8 of Figure 7.

Figure 9 is a view of the shifting mechanism for the steering connection taken along the line 9—9 of Figure 7.

Figure 10 is a sectional view illustrating the various steering connections taken along the line 10—10 of Figure 7.

Figure 11 illustrates a modification of my shifting mechanism for the steering connection.

Figure 12 is a diagrammatical illustration of electrical connections for the shifting mechanism shown in Figure 11.

Figure 13 illustrates a modified form of steering lever in which either one or both of the steering connections may be shifted along the lever.

Figure 14 discloses a vehicle of the front wheel drive type in which my invention has been embodied.

Referring now more particularly to the drawings and especially to Figures 1 to 3 thereof, there is shown in plan a vehicle having a frame 1 and provided with the customary propelling motor 2. This motor serves to propel the vehicle in the customary manner through the intermediary of the conventional transmission 3 and drive shaft 4. Universal joints 5 are utilized in the ordinary manner for connecting the drive shaft 4. The engine 2 is also provided with the customary radiator 6 for cooling purposes.

At the forward end of the vehicle as illustrated in these figures there is provided a fixed axle 7 of conventional construction, to the ends of which are swivelled the swivelling knuckles 8 carrying the arms 9. Each of these knuckles is provided with a spindle upon which is mounted one of the front wheels 10. Connecting the arms 9 of the swivels 7 so as to maintain the swivels in the proper relationship is a tie rod 11 such as is ordinarily used for this purpose.

At the rear of the vehicle, instead of the usual construction there is provided the fixed axle 12 which supports the weight of the vehicle and is provided at its ends with means, swivelling the two steering knuckles 13, each provided with an arm 14. Each of these steering knuckles, as in the case of the front steering knuckles 8, has a spindle upon which is mounted one of the rear wheels 15. Connecting the ends of the arms 14 for the purpose of maintaining the knuckles 13 in their proper relation to each other is a tie rod 16. The construction so far described in connection with the rear end of the vehicle is very similar to that used for the front end of the vehicle.

However, it is necessary in order to accommodate the drive mechanism that the construction at the rear end of the vehicle be slightly modified. The fixed axle 12, instead of being straight as in the case of the axle 7 at the front of the vehicle, is bent at its ends so that its main portion is offset forwardly of the axis of the rear wheels. It is readily apparent that this axle might, however, be offset rearwardly of the axis of the rear wheels as well as forwardly thereof as shown. At the center of the vehicle this fixed axle 12 is provided with a bearing 17 which receives a portion of the driving or propeller shaft. This shaft, after extending through the bearing 17, enters the differential housing 18 which is of substantially conventional design. This differential mechanism is then connected to the rear wheels 15 by means of suitable universal joints and other connections.

Referring again to the steering mechanism, one of the steering knuckles 8, and the steering knuckle 13 which is on the same side of the vehicle as said knuckle 8, are provided respectively with steering arms 19 and 20. These steering arms are adapted to control the swivelling action of each of the respective sets of wheels. To the end of the steering arm 19 there is attached a steering rod 21 which extends rearwardly of the vehicle and is connected at its other end as will be hereinafter described. Attached likewise to the end of the arm 20 is a second steering rod 22 which extends forwardly substantially to the free end of the arm 21.

Mounted on the side of the vehicle at a point closely adjacent the ends of the rods 21 and 22 is a lever 23 to which said rods are adapted to be connected.

Referring more particularly to Figures 4, 5 and 6 it will be observed that the rod 21 is fixedly pivoted to one end of the lever 23. The rod 22, on the other hand, is slidingly connected to the lever 23 so that it may be positioned at the middle of said lever as shown in Figures 1 and 4, at the same end of the said lever as the rod 21 as shown in Figures 2 and 5, or at the opposite end of said lever from the rod 21 as shown in the Figures 3 and 6.

The lever 23, as will be readily observed from Figure 1 is controlled by means of a steering wheel 24 through the intermediary of the steering shaft 25 and the steering worm 26. This lever is shown mounted directly on the worm shaft 28 to be rotated thereby, but it will be readily appreciated that it may be mounted in any other desired position and connected with the worm shaft for operation thereby. The lever 23 is provided with a slot 27 in which the connection with the rod 22 is adapted to slide.

From the foregoing it will be readily seen that if the rod 22 be positioned as shown in Figures 1 and 4, the rear wheels 15 of the vehicle will be maintained in their neutral position while the front wheels 10 of the vehicle will be swivelled in the ordinary manner by the action of the steering mechanism in rotating the lever 23. If the rod 22 be positioned as shown in Figures 2 and 5, at the same end of the lever as the rod 21, it is obvious that the front wheels 10 and the rear wheels 15 will be swivelled simultaneously by the action of the steering mechanism and all of these wheels will be swivelled in the same direction. If the arm 22 be positioned at the opposite end of the lever 23 from the arm 21, as shown in Figures 3 and 6, it is also obvious that the front wheels 10 and the rear wheels 15 will be swivelled simultaneously, but that they will be swivelled in opposite directions by the action of the steering mechanism.

Referring now more particularly to Figures 7, 8, 9 and 10, the details of the connections of the various members to the lever 23 will be described. The lever 23, as clearly shown in Figures 8 and 10, is provided adjacent its lower end with a ball member 29 which is adapted to be received within the hollow end 30 of the rod 21. The lever 23 is likewise provided with a member carrying a ball 31 which member is adapted to slide in the slot 27 of the lever. The ball 31 is adapted to be received in the hollow end 32 of the rod 22 in the same manner that the ball 29 is adapted to be received into the hollow end 30 of the rod 21. A spring 33 of the coil type is placed within each of these hollow ends between the bottoms of the hollows and the respective balls. For the purpose of retaining the balls in place and completing the ball and socket joints, there are screwed into the ends of these hollow portions 30 and 32 plugs 34 which bear against the balls 29 and 31 to retain them in place. It will be seen from this description that the rods 21 and 22 are each connected to the lever 23 by means of a slightly resilient ball and socket joint. It will be further appreciated that the joint between the rod 22 and the lever 23 is slidable longitudinally of the lever for the purpose hereinbefore described.

For the purpose of shifting or sliding the joint between the rod 22 and the lever 23 to the desired position, there is provided an apparatus which is clearly shown in Figures 7, 9 and 10. A guide member 35 is rigidly attached to the side frame or other convenient part of the vehicle by rivets or similar means as at 36. This guide carries a member 37 by means of a T-shaped extension 37' by which it is retained within the guide member 35. The member 37 which is adapted to slide in the guide member 35 is provided with an opening 38 through which the rod 22 is adapted to pass. At the upper side of the member 37, ears 39 are formed for the purpose of receiving a bar member 40 which is attached thereto by means such as a pin 41. An apertured member 42 is rigidly attached to some convenient portion of the vehicle by means such as the rivets 43 and is adapted to receive the upper portion of the bar 40 within its aperture. The bar 40 is further provided at its extreme upper end with a handle 44 for use by the operator in shifting the rod 22 and its connection with the lever 23.

As shown in Figure 7, the bar 40 is provided at one edge thereof with teeth 45 which are adapted to engage the member 42 to maintain the bar in whatever position it is placed. A spring 47 is attached at one end to the member 42 in such a manner as to bear against the edge of the bar 40 and force the teeth 45 into engagement with the member 42.

It is clear from the above discussion that the operator of the vehicle may at will grasp the handle 44 and shift the bar 40 to any position which he desires, allowing the teeth 45 and the spring 47 in connection with the member 42 to lock the same in position. It will be appreciated that when the bar 40 is thus shifted by the operator it will shift the shaft 22 up or down as the case may be and will accordingly shift the position of the connection between the shaft 22 and the lever 23 longitudinally of the lever. Thus by virtue of this arrangement the operator is enabled to position and fix the connection between the shaft 22 and the lever 23 at any point on the lever.

In Figure 11 there is shown an alternative means whereby the connection between the lever and the shaft 22 may be shifted. The lever in this case is slightly modified so that the connection between it and the shaft 21 is positioned at the upper end thereof instead of at the lower end. The lever is further provided with bearings 51 and 52 at its upper and lower ends for the purpose of receiving a screw 50 and rotatably supporting it therein. The ball 31' is provided with a modified member 48 which engages the slot in the lever and which member 48 is adapted to receive the screw 50. It is readily apparent that upon rotation of the screw the member 48 and the entire connection between the lever 23' and the rod 22 will be shifted upwardly or downwardly. At the lower end of the screw 50 there is provided a pinion 53 which meshes with the pinion 54 on the shaft of an electric motor 55. This electric motor 55 is secured to the lower end of the lever 23' as at 56. A housing 57 is provided for the purpose of enclosing and protecting the pinions 53 and 54.

In Figure 12 I have illustrated diagrammatically an example of the electrical connections which might be utilized to operate the motor of Figure 11. Two long contact bars 58 and 59 and three short contact bars 60, 61, and 62 are all mounted on an insulating strip 63. As shown, the short bars 60 and 62 are at the bottom and top respectively and the short bar 61 is at the middle of the strip 63. The long bars 58 and 59 are mounted respectively below and above the bar 51. The strip 63 is then secured to the lever 23' as shown so that the member 48 makes contact successively with each of the contact bars as it travels from one end to the other of the lever.

All three of the short contact bars just described are connected to one terminal of a push button switch 64 as shown. The two long contact bars are both connected to the other terminal of the switch 64 and also to one of the terminals of the battery 66. The other terminal of the battery 66 is connected to one of the terminals of the motor. The other terminal of the motor is connected to the screw through the reversing switch 65.

From the above it will be apparent that the bars 58 and 59 will be energized at all times. However, the bars 60, 61, and 62 are not energized normally, and hence when the member 48 contacts solely with one of these short bars the motor circuit will be broken and the motor will not run. When the member 48 is in contact with one of the short bars it will remain there until the operator desires to shift it. To shift the member 48, it is first necessary to set the reversing switch for the direction in which it is desired for it to move. The button 64 is then pushed, energizing the short bars for a sufficient length of time to bring the member 48 into contact with the adjoining long bar, after which the button is released. The motor will then run until the member 48 again contacts solely with one of the short bars, when it will stop. It is then necessary to repeat the operation to again shift the member 48.

In Figure 13 there is illustrated a modified form of lever 23" which is so designed that either the joint between the rod 21 or the joint 22 and the lever or both may be shifted longitudinally of the lever. For this purpose two slots 27' and 27" are provided for the purpose of receiving the respective joints and allowing them to slide with respect to the lever. By this arrangement either the front or the rear wheels might be locked against swivelling while the other wheels were caused to swivel in any direction desired. The wheels might also, as in the case of the other modifications, be caused to swivel simultaneously either in the same or in opposite directions.

In Figure 14 I have illustrated my invention in connection with a motor vehicle of the front wheel drive type. In this embodiment the rear axle 7', the rear knuckles 8' and the rear tie rod 11' are substantially identical with the corresponding front members 7, 8 and 11 shown in Figures 1 to 3. The rear wheels 15' are the same as the rear wheels 15 of Figures 1 to 3 with the exception that they are not called upon to perform the function of driving the vehicle. At the front of the vehicle on the other hand, the fixed axle 12' has been formed in substantially the same manner that the fixed rear axle 12 was formed in Figures 1 to 3. This axle is likewise provided at its ends with steering knuckles 13' having arms 14' similar to steering knuckles 13 and the arms 14 of Figures 1 to 3. The tie rod 16' also corresponds to the rear tie rod of the rear wheel drive vehicle.

The differential 18' is likewise mounted opposite the center of the fixed axle 12', but it is noted that no bearing is necessary in the axle 12' in the instance of the rear wheel drive vehicle. In substantially the same manner as in the rear wheel drive vehicle, one of the front knuckles 13' is provided with a steering arm 19' to which is attached the steering rod 21. Likewise the steering knuckle 8' on the same side of the vehicle is provided with a steering arm 20' to which is attached the forwardly extending steering rod 22. The operation of the device shown in this figure is substantially the same as that in the device formerly described. It is therefore not believed to be necessary to go into the details of the operation.

The entire operation of my above described steering apparatus will be clearly apprehended from the description. In ordinary driving, many vehicle operators would prefer to have the rear wheels locked in the neutral position as shown in Figure 1. To this end they would position the connection between the rod 22 and the lever 23 at the axis of the said lever so that the rear wheels would not be swivelled under any circumstances. When a mechanism is thus adjusted, the driving of the vehicle will be accomplished in the same manner as in the ordinary construction at the present time. The operator will not therefore be required to make allowance for any difference in operation in ordinary driving. When it is desired to park the vehicle, especially when the parking is parallel to the curb and the space in which the car is to be parked is only slightly longer than the car itself, the operator has to shift the connection between the shaft 22 and the lever 23 so that it is at the same end of the lever as the connection between the rod 22 and the lever 23. When in this position the front and rear wheels will both be swivelled at the same time and in the same direction, thus enabling the vehicle to be moved bodily in a lateral direction and greatly facilitate parking in a limited space.

When it is desired to make an unusually sharp turn with a vehicle, or when it is desired that the rear wheels follow substantially in the tracks of the front wheels, the connection between the rod 22 and the lever 23 is shifted to the opposite end of the lever from its connection with the rod 21. When in this position the wheels will be turned simultaneously, but they will be turned in opposite directions so that while the front end is being shifted laterally in one direction the rear end is being shifted laterally in the other direction. The rear wheels will then follow directly or substantially in the path of the front wheels and will enable the vehicle to make an exceedingly short turn.

In shifting the connection between the rod 22 and the lever 23, the operator has merely to grasp the handle 44 which extends upwardly to the inside of the vehicle and to pull upwardly or push downwardly upon said handle after having disengaged the teeth 45 from the member 42. When the rod 22 has been shifted to the desired position, the handle 44 is merely released, thus allowing the teeth 45 to again be engaged with the member 42 by the spring 47.

The shifting device of Figure 11 is operated to perform substantially the same result as that shown in Figures 7, 9 and 10, with the exception that it is operated by means of an electric switch or button conveniently placed. It will be appreciated that any switch which reverses the direction of rotation of the motor 55 will be suitable and that the operation of said switch will cause the joint to be shifted in whatever direction desired. The arrangement of Figure 12 causes the joint to be automatically stopped when it reaches either end or the center of the lever.

The lever shown in Figure 13 is the same in all respects as the levers shown in the preceding figures with the exception that two shifting joints are provided thereon instead of one. The shifting of these joints may be accomplished in either manner above described by a combination of the two, or in some other suitable manner. It will likewise be noted that a separate shifting mechanism should be provided for each joint, although a single shifting mechanism might be arranged to shift the joints either selectively or together.

It will be appreciated from the foregoing that I have provided a steering apparatus for a vehicle which enables both the front and rear swivelling members to be swivelled simultaneously in the same direction, and thereby enable a vehicle to be shifted bodily in a lateral direction. As has been already pointed out this feature is of considerable importance in parking a vehicle under normal modern conditions. A great deal of the difficulty of parking in a very limited space can be avoided and the parking greatly facilitated by virtue of my improved steering apparatus.

It will further be appreciated that I have provided a steering apparatus in which the operator can at will cause the apparatus to function in whatever manner he desires. In my improved construction the operator has his choice of steering the vehicle in three different manners.

Furthermore it is pointed out that by virtue of my novel construction the operator is enabled to choose the manner in which he desires the steering apparatus to function at any particular time and to adjust the apparatus so that it will function in that manner without leaving his position within the vehicle.

By a modification which I have illustrated, the operator of a vehicle provided with my invention might lock the front wheels against swivelling and cause the rear wheels to swivel in a situation where such a manner of functioning seemed to be desirable. All of these things may be carried out without the operator leaving his seat within the vehicle, and it is conceivable that they might even be carried out while the vehicle is in motion. I have thus provided a steering apparatus which accomplishes a new function, a steering apparatus which accomplishes any of a plurality of functions according to the desires of the operator, and an apparatus in which the operator may cause any of these functions to be produced with a minimum of inconvenience and effort.

It will be appreciated that various modifications may be made in the apparatus herein depicted and described without exceeding the scope of my invention, and I wish it to be clearly understood that the scope of my invention is to be limited only by the prior art and the terms of the appended claims.

I claim:

1. In a steering apparatus for a vehicle having a lever pivoted on the vehicle and a rod connected to said lever by a connection slidable longitudinally of the lever, electric means for sliding said connection comprising a motor and a plurality of contact bars associated with said motor, said contact bars being positioned in said lever and contacting with the connection for sliding it to any desired position.

2. In a steering apparatus for a vehicle, a front swivelling member, a rear swivelling member, a lever mounted on the vehicle, rods attached respectively to each of said swivelling members and extending to said lever, a connection between each of said rods and said lever, at least one of said connections being slidable longitudinally of said lever, means for sliding said connection comprising a screw extending longitudinally of said lever and engaging said connection to shift same on rotation of the screw and an electric motor adapted to rotate said screw.

3. In a steering apparatus for a vehicle, a front swivelling member, a rear swivelling member, a lever mounted on the vehicle, rods attached respectively to each of said swivelling members and extending to said lever, a connection between each of said rods and said lever, at least one of said connections being slidable longitudinally of said lever, electric means for sliding said connection comprising a motor and a plurality of contact bars associated with said motor, said contact bars being positioned within the lever and contacting with the connection for sliding it to any desired position.

In testimony whereof I affix my signature.

ROGER BROOKS.